(12) United States Patent
Negishi (10) Patent No.: US 6,717,891 B2
(45) Date of Patent: Apr. 6, 2004

(54) REPRODUCING DEVICE AND REPRODUCING METHOD

(75) Inventor: Masato Negishi, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 128 days.

(21) Appl. No.: 10/009,834

(22) PCT Filed: Apr. 18, 2001

(86) PCT No.: PCT/JP01/03301

§ 371 (c)(1),
(2), (4) Date: Apr. 4, 2002

(87) PCT Pub. No.: WO01/80245

PCT Pub. Date: Oct. 25, 2001

(65) Prior Publication Data

US 2002/0122357 A1 Sep. 5, 2002

(30) Foreign Application Priority Data

Apr. 18, 2000 (JP) .......................................... 2000-116066

(51) Int. Cl.$^7$ ............................................. G11B 21/08
(52) U.S. Cl. ...................................... 369/30.11; 386/96
(58) Field of Search ........................... 369/30.11, 30.07, 369/30.08, 30.09, 30.1, 30.12, 30.18, 278.3; 386/95, 96, 99, 104, 105, 106, 125, 126

(56) References Cited

U.S. PATENT DOCUMENTS

| 5,987,417 | A | * | 11/1999 | Heo et al. ..................... 704/500 |
| 6,449,227 | B1 | * | 9/2002 | Heo .......................... 369/47.15 |
| 6,473,374 | B1 | * | 10/2002 | Kawamura et al. ......... 369/47.1 |
| 6,473,561 | B1 | * | 10/2002 | Heo ............................ 386/125 |
| 6,636,474 | B1 | * | 10/2003 | Tanaka et al. ............ 369/275.3 |

FOREIGN PATENT DOCUMENTS

| EP | 1-059642 A2 | * | 12/2000 | .............. 369/30.11 |
| JP | 61-57082 | | 3/1986 | |
| JP | 10-162561 | | 6/1998 | |

* cited by examiner

Primary Examiner—Tan Dinh
(74) Attorney, Agent, or Firm—Wenderoth, Lind & Ponack, L.L.P.

(57) ABSTRACT

The present invention searches the data of the desired time with fewer access frequencies from a recording medium in which information is recorded by the recording system where the signal playback time length is not proportional to the data amount of the relevant signal. The playback apparatus of the present invention comprises a playback section for reading an information unit of audiovisual subject and management information containing playback time information of the information unit and recorded position information from a recording medium, and a control section for searching the recorded position of the information unit based on the recorded position information and for playing back the information unit from the position. When the information unit is played back from the desired playback time, the control section finds the estimated straight line in which the played back time is proportional to the data mount based on the playback time information and the recorded position information, and searches the estimated recorded position that corresponds to the desired playback time based on the estimated straight line. The control section calculates the error between the actual playback time and the desired playback time of the information unit at the estimated recorded position and identifies the estimated recorded position as the recorded position of the information unit at the desired playback time when the error is included in the specified range.

8 Claims, 6 Drawing Sheets

REPRODUCING DEVICE AND REPRODUCING METHOD

BACKGROUND OF THE INVENTION

The present invention relates to a technique for playing back information from recording media, and more specifically, to a technique for accessing desired playback time of the information when the information is recorded on the recording medium by a coding scheme in which playback time length is not proportional to coded data amount.

DESCRIPTION ON RELATED ART

In recent years, Digital Versatile Disc (hereinafter referred to as "DVD") has been gaining popularity. The recording capacity of DVD is several times greater than that of Compact Disc (hereinafter referred to as "CD"). For DVD standard, there are DVD-Video for video/audio playback and DVD-Audio for making a point of audio playback which is added to DVD-Video. In DVD-Audio standard, almost all the information recorded on the disc is used for audio playback.

In DVD-Audio standard, there are two types of methods to record audio data on DVD: Linear PCM and Packed PCM. The two types are the same in that the audio data is coded to generate coded data and is recorded on the DVD. However, in Linear PCM, the playback time is proportional to the coded data amount, whereas in Packed PCM, the playback time is not proportional to the coded data amount. Packed PCM uses characteristics of audio signals to compress and record the compressed information, and varies the coded data amount per time in accordance with the temporal repetition of audio data and/or correlation between channels. At a restricted rate, Packed PCM achieves the sound quality exceeding that of Linear PCM.

In DVD-Audio, for example, when a user wishes to start playback from the desired time such as from the midst of music, not from the head of it, or when a user wishes to play back repeatedly the interval of specific times, the playback apparatus should know at which location on the disc the coded data corresponding to the object time is recorded. The recording position of the coded data that corresponds to the object time can be simply calculated if the time length of audio signal is proportional to the coded data amount as is the case of Linear PCM. However, when the playback time length of the audio signal is not proportional to the coded data amount as is the case of Packed PCM, the recording position of the coded data corresponding to the object time is unable to be simply calculated.

Figure 5:
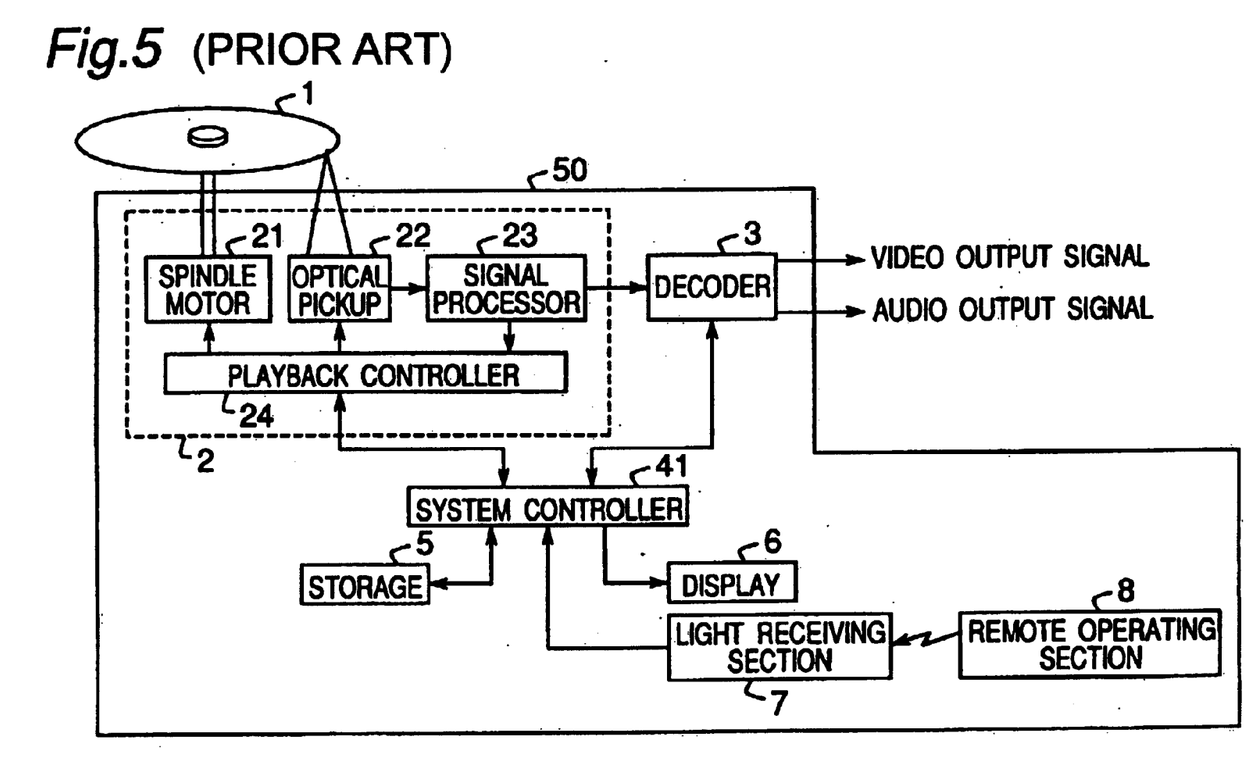
FIG. 5 is a block diagram of the configuration of a conventional playback apparatus.

FIG. 5 is a block diagram of the configuration of the conventional playback apparatus. Playback apparatus 50 plays back a disc 1 in which the multimedia data is recorded by a recording scheme with the signal playback length not proportional to the coded data amount. On disc 1, multimedia data and management information are recorded. The management information includes information of the start address of the cell that composes the relevant multimedia data, information of end address (i.e. information of data recorded position), and information on the time required for playing back the relevant multimedia data (playback time information).

Playback apparatus 50 comprises a playback section 2, decoder 3, system controller 41, storage 5, display 6, light receiving section 7, and remote operating section 8. Playback section 2 plays back the multimedia data and management information from disc 1. Decoder 3 decodes the multimedia data and management information of disc 1 and outputs video signal and/or audio signal. System controller 41 identifies the position of the multimedia data to be played back on disc 1, and orders playback section 2, decoder 3, etc. to play back, decode, etc. of multimedia data from the position. Storage 5 is a memory to which system controller 41 accesses to write and read data. Display 6 is controlled by system controller 41. Remote operating section 8 transmits signals such as infrared signals that correspond to user operation. Light receiving section 7 receives signals such as infrared rays from remote operating section 8.

Once disc 1 is set, system controller 41 controls playback section 2 and plays back management information of disc 1 and allows storage 5 to store the information. When the user operates "playback" from remote operating section 8, system controller 41 recognizes this operation via light receiving section 7, controls playback section 2 based on the management information stored, and plays back disc 1. When the desired time to be searched is indicated from remote operating section 8, system controller 41 recognizes the instruction and allows storage 5 to store the desired time. When the operation to start searching is carried out, searching processing of the desired time as shown in FIG. 6 is executed.

Figure 6:
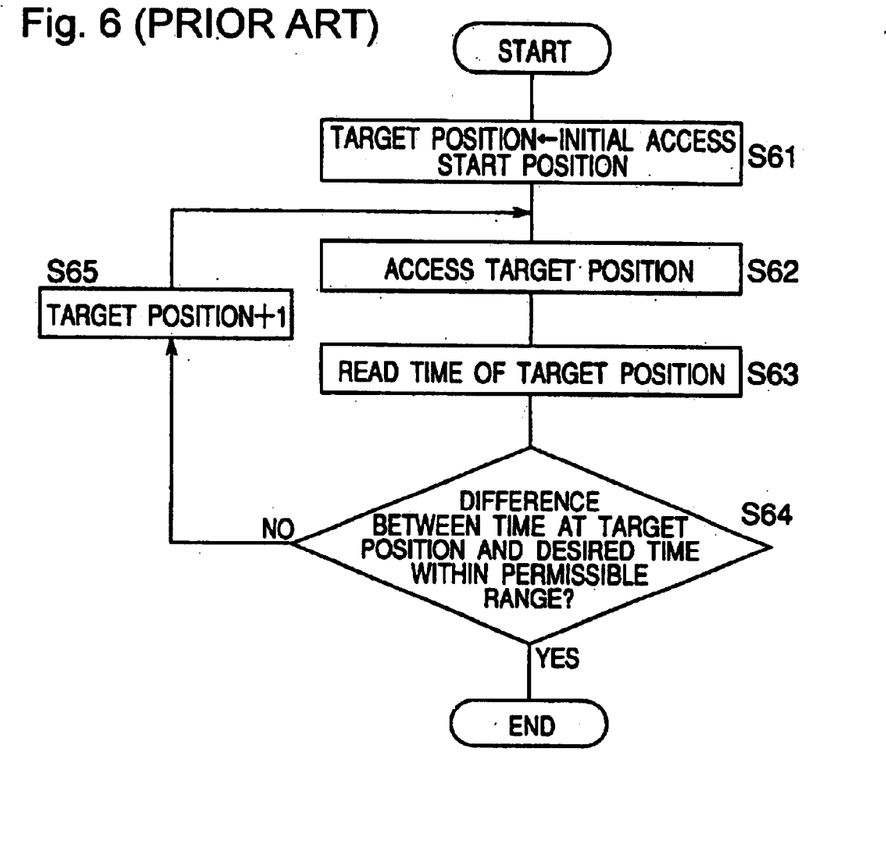
FIG. 6 is a flow chart of search treatment of the desired time in the playback apparatus.

FIG. 6 is a flow chart of the search processing of the desired time in playback apparatus 50 (FIG. 5). When the desired time to be searched is set and search starting operation is carried out from remote operating section 8, search processing is begun. This processing is carried out primarily according to the instructions of system controller 41 (FIG. 5). In Step S61, the coded data start position is substituted in the target position and the process moves to Step S62. Right after the start of processing, the preset access initial start position is substituted as the coded data start position. In step S62, the relevant target position is accessed and the process moves to Step S63. In Step S63, the playback time is read at the relevant target position and process moves to Step S64. In Step S64, determination is made on whether the difference between a time presented by the relevant time information and the desired time is within the permissible range or not, and if it is not within the permissible range, the process moves to Step S65. In Step S65, 1 is added to the value of target position and the process returns to Step S62. The operations from Step S62 to Step S65 are repeated until the difference between a time presented by the relevant time information and the desired time is judged within the permissible range, and when the difference is determined within the permissible range in Step S64, the relevant search is ended as the desired time has been reached.

Playback apparatus 50 (FIG. 5) that carries out this kind of search processing has a problem of excessively many access frequencies and takes time for searching, because playback apparatus 50 (FIG. 5) accesses the coded data successively from the specified start position and repeats the access until it reaches the coded data that corresponds to the signal of the desired time.

The present invention has been made in view of these circumstances, and it is an object of the present invention to search the data that corresponds to the signal of the desired time with fewer access frequencies in playing back the recording medium on which the information is recorded by the recording method where the signal playback time length is not proportional to the data amount of the relevant signal.

SUMMARY OF THE INVENTION

The playback apparatus according to the present invention is a playback apparatus comprising a playback section for reading an information unit and management information from a recording medium on which the information unit of audiovisual subject for a user and the management information containing playback time information pertaining to a playback time of the information unit and recorded position information pertaining to a recorded position of the information unit are recorded; an operating section for inputting a desired playback time of the information unit; and a control section for searching the recorded position on the recording medium of the information unit based on the recorded position information read by the playback section and for controlling the playback section to play back the information unit from the recorded position, wherein when the information unit is played back from the desired playback time inputted from the operating section, the control section finds an estimated straight line in which the playback time and data amount are proportional to each other based on the playback time information and the recorded position information, the control section searches an estimated recorded position that corresponds to the desired playback time based on the estimated straight line, calculates an error between an actual playback time of the information unit at the estimated recorded position and the desired playback time, and identifies the estimated recorded position as the recorded position of the information unit on the recording medium that corresponds to the desired playback time when the error is within a specified range, thereby the above-mentioned object can be achieved.

A gradient of the estimated straight line is a ratio of the playback time of the information unit to the data amount.

If the error is beyond the specified range, the control section finds a next estimated straight line at least based on the estimated recorded position and the playback time of the information unit that corresponds to the estimated recorded position, searches the next estimated recorded position that corresponds to the desired playback time based on the estimated straight line, calculates an error between an actual playback time of the information unit at a next estimated recorded position and the desired playback time, and repeats searching until the error is included in the specified range.

The gradient of a next estimated straight line is a ratio of a difference of the actual playback time of the information unit to a difference of the data amount at the most recently obtained two estimated recorded positions.

The playback method according to the present invention is a playback method comprising steps of: reading an information unit and management information from a recording medium on which the information unit of audiovisual subject for a user and the management information containing playback time information pertaining to a playback time of the information unit and recorded position information pertaining to a recorded position of the information unit are recorded; inputting a desired playback time of the information unit; searching the recorded position on the recording medium of the information unit based on the recorded position information read; and controlling playback to play back the information unit from the recorded position, wherein when the information unit is played back from the desired playback time inputted, the playback method further comprises steps of: finding an estimated straight line in which the playback time and data amount are proportional to each other based on the playback time information and the recorded position information; searching an estimated recorded position that corresponds to the desired playback time based on the estimated straight line; calculating an error between an actual playback time of the information unit at the estimated recorded position and the desired playback time; and identifying the estimated recorded position as the recorded position of the information unit on the recording medium that corresponds to the desired playback time when the error is within a specified range, thereby the above-mentioned object can be achieved.

Said finding the estimated straight line includes calculating a ratio of the playback time of the information unit to the data amount to find a gradient of the estimated straight line.

When the error is beyond the specified range, the playback method includes steps of (a) finding a next straight line at least based on the estimated recorded position and the playback time of the information unit that corresponds to the estimated recorded position; (b) searching the next estimated recorded position that corresponds to the desired playback time based on the estimated straight line; (c) calculating an error between an actual playback time of the information unit at a next estimated recorded position and the desired playback time; and (d) repeating steps (a) through (c) until the error is included in the specified range.

Said finding a next estimated straight line includes a step of calculating a ratio of a difference of the actual playback time of the information unit to a difference of the data amount at the most recently obtained two estimated recorded positions to find a gradient of the next estimated straight line.

DETAILED DESCRIPTION OF THE PREFERRED EMBODIMENTS

Referring now to attached FIG. 1 through FIG. 4, the preferred embodiment of the present invention will be described in detail as follows.

Figure 1:
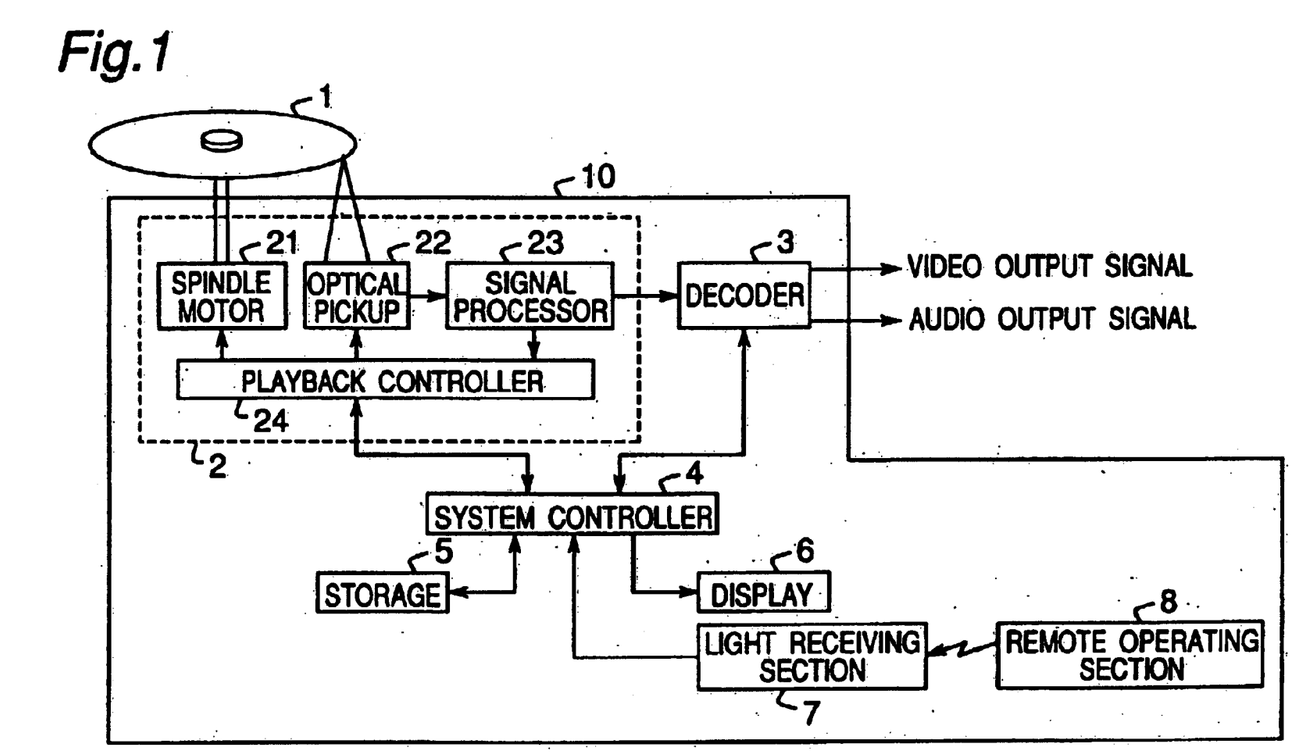
FIG. 1 is a block diagram of a configuration of the playback apparatus according to the present embodiment.

FIG. 1 is a block diagram of a configuration of playback apparatus 10 according to the present embodiment. Playback apparatus 10 plays back the information from the recording medium on which the specified information is recorded. Recording medium 1 is, for example, an optical disc and is referred to as a disc 1. In the present embodiment, first of all, the information recorded on disc 1 is discussed, and then, each component of playback apparatus 10 will be discussed.

On disc 1, one or more information units and management information pertaining to the information units are recorded in different areas, respectively. The "information unit" means a group of information containing audio information such as music, natural environmental sounds, sounds for enjoying dramas and entertainments, sounds for broadcasting and news, sounds for education (e.g. languages), sounds for being used in scientific technical fields, and is an audiovisual subject by users. The playback time from start of playback of the information unit to end is variable according to every information unit and is not restricted to be constant. On the other hand, the management information contains recorded position information of the information unit on disc 1 and the playback time information pertaining to the information unit. To be more specific, taken for an example, description will be made with a disc 1 on which a plurality of pieces of music (hereinafter called the "track") are recorded. Each of a plurality of tracks corresponds to the information unit. Each track is composed of one or more cells. The management information includes, for each track, a start address of a top cell, an end address of a final cell, a start presentation time, and a playback time.

Next, playback apparatus 10 comprises a playback section 2, decoder 3, system controller 4, storage 5, display 6, light receiving section 7, and remote operating section 8. Playback section 2 playbacks each information unit and management information from disc 1. The term "playback" means to read the coded data from disc 1 as it is. To play back, playback section 2 includes a spindle motor 21 for rotating disc 1, a optical pickup 22 for irradiating a light beam to disc 1 so as to detect the reflected light beam, a signal processor 23 for reading and processing the signal based on the detected reflected light, and a playback controller 24. Playback controller 24 controls spindle motor 21, optical pickup 22, and signal processor 23 in compliance with the instructions from system controller 4 later discussed. Playback section 2 plays back the information recorded on disc 1, that is, information unit and management information, and sends to decoder 3. Decoder 3 decodes each information unit and management information of disc 1, and outputs the video signal and the audio signal. System controller 4 identifies the position of each information unit to be played back on disc 1, and instructs playback section 2, decoder 3, etc. to play back, decode, etc. each information unit from the position. Storage 5 is a memory to which system controller 4 accesses to write and read data. Display 6 is controlled by system controller 4. Remote operating section 8 is operated by the user using infrared rays, etc. Light receiving section 7 is a component for receiving infrared rays from remote operating section 8.

Now, the operation of system controller 4 will be described. When disc 1 is set, system controller 4 controls playback section 2 to playback the management information recorded on disc 1, and stores the management information to storage 5. When the user carries out "playback" operation from remote operating section 8, system controller 4 recognizes the instruction based on the operation via light receiving section 7, and controls playback section 2 for playing back disc 1 in compliance with the management information stored in storage 5. For example, when the user operates to play back the second track, system controller 4 accesses the start address of the top cell of the second track, reads the information from the position, and plays back the information.

On the other hand, when the user enters the desired time to be searched or to be accessed from remote operating section 8, system controller 4 recognizes the instruction and allows storage 5 to store the desired time. When the search start operation is carried out, system controller 4 executes the search processing of the desired time shown in FIG. 2.

Figure 2:
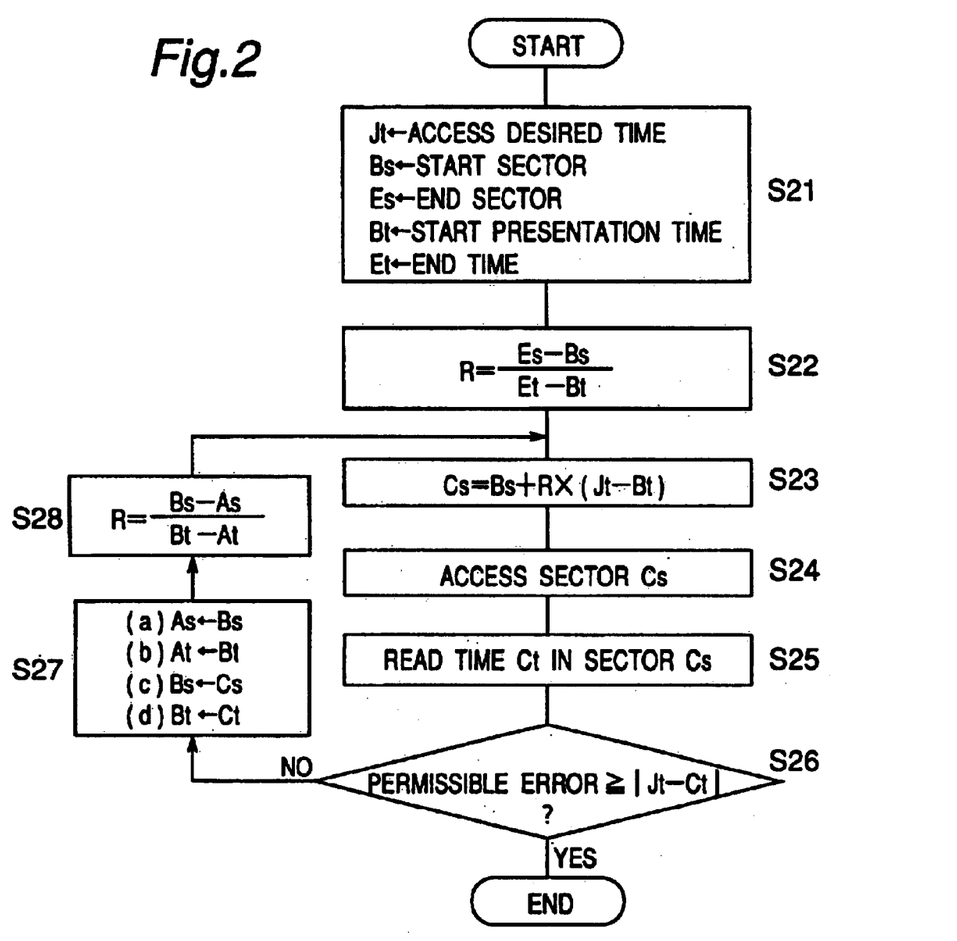
FIG. 2 is a flow chart of the search treatment of desired playback time in the playback apparatus.
Figure 3A:
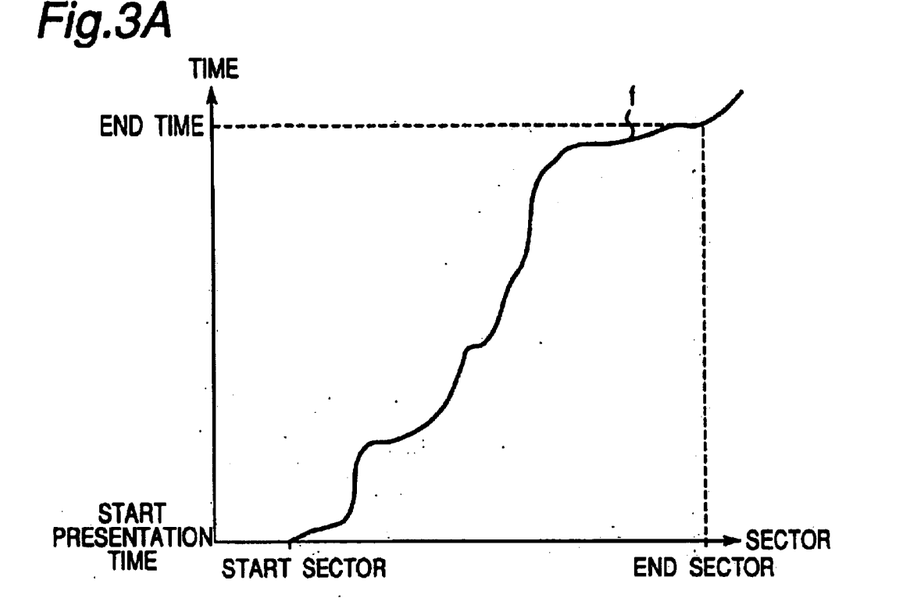
FIG. 3A is graph f of the relationship between the time and data amount in the information unit (track) subject to playback.

FIG. 2 is a flow chart of the search processing of the desired playback time in playback apparatus 10 (FIG. 1). This processing is carried out primarily based on the instruction of system controller 4 (FIG. 1). In this part of the section, referring to FIGS. 3A and 3B suitably, the flow chart of FIG. 2 is described. FIG. 3A is graph f of the relationship between the time in the information unit (track) which is subject to playback and the data amount. It indicates that the playback time of the information unit and the data amount are not proportional to each other. In FIG. 3A, the data amount is taken as abscissa using sectors of disc 1. When the desired time to be searched is set by the remote operating section 8 (FIG. 1), processing for searching the relevant desired time is begun.

Figure 3B:
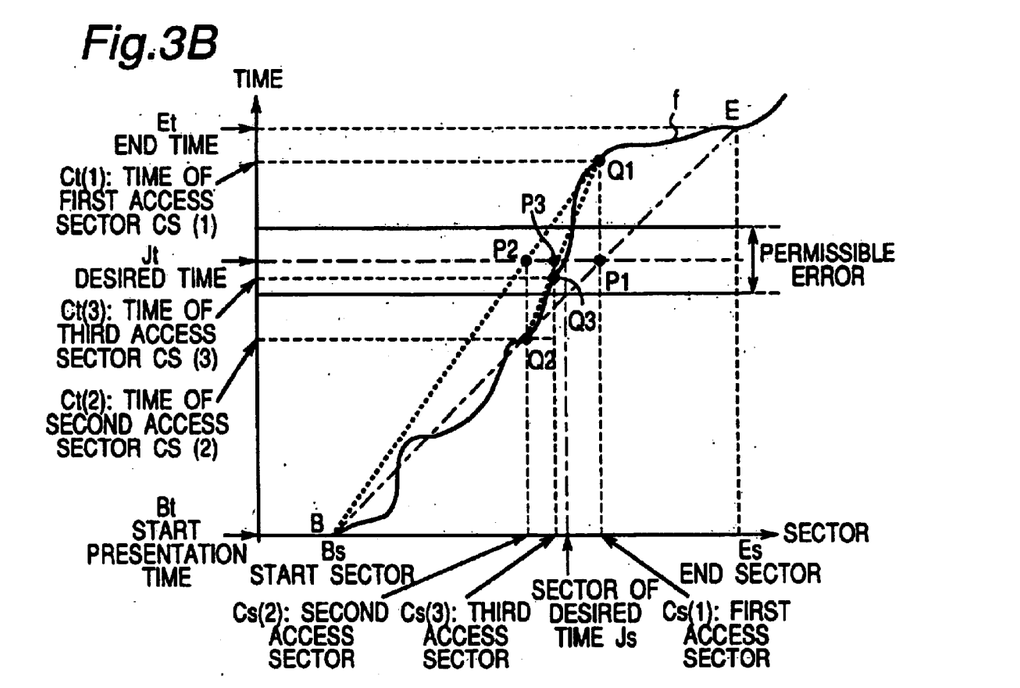
FIG. 3B is a diagram of the access procedure to the desired time according to the present invention.

First of all, in Step S21 of FIG. 2, four data values are substituted in four variables. That is, the access desired time for finding the access set by the remote operating section 8 (FIG. 1) is substituted in variable Jt. From the management information held in storage 5 (FIG. 1), the start address (start sector) of the top cell of the track, end address (end sector) of the final cell of the track, start presentation time of the track, and playback time of the track are read, and the start sector is substituted into Bs, the end sector into Es, start presentation time into Bt, and end time into Et. The end time can be calculated by (track start presentation time)+(track playback time). These are given as shown in FIG. 3B. FIG. 3B is a diagram of the access sequence to the desired time by the present embodiment. In this figure, the previous graph f is shown together. Bs in the sector on abscissa is the start sector and Es the end sector. Bt in the time on ordinate is the start presentation time and Et the end time.

Because the playback time of information unit is not proportional to the data amount of the relevant information unit, playback apparatus 10 (FIG. 1) cannot simply calculate the sector Js of the desired time from the desired time Jt set by remote operating section 8. Therefore, processing moves to Step S22 of FIG. 2. In Step S22, the difference between Es and Bs, which corresponds to the decoded data amounts, is divided by the difference between Et and Bt to obtain the average coded data amount of the information unit per unit time R (average data amount). In other words, the average data amount R is a ratio of the information unit playback time to data amount. In FIG. 3B, the average data amount R is a gradient shown by the alternate long and short dash line BE with respect to the time axis.

In next Step S23 of FIG. 2, the difference between the desired time Jt and Bt is multiplied by R, Bs is added to the product, and the estimated sector Cs in which coded data of the desired time is recorded is found, and processing is moved to Step S24. This estimated sector Cs is the sector Cs (1) of point P1 in FIG. 3B where the desired time Jt and BE representing the average data amount R, intersect each other, and is the estimated recorded position.

In Step S24, the estimated sector Cs is accessed and processing moves to Step S25. In Step S25, time Ct at the estimated sector Cs is read, and processing moves to Step S26. Ct (1) first found is the time of point Q1 where the sector Cs (1) and graph f intersect each other. That is, Ct (1) shows the playback time of the coded data of the information unit stored in sector Cs (1).

In Step S26, whether the difference between desired time Jt and Ct is within the permissible range or not is determined, and if it is not within the permissible range, processing moves to Step S27. The permissible range is, for example, ±1 second, and evaluation as to whether or not within the range is determined by whether or not (permissible error)$\geq |Jt - Ct|$. Ct (1) in the figure deviates from the permissible range shown by a solid line as the "permissible error" above and below the desired time Jt, and is not within the permissible range. Therefore, processing moves to Step S27.

In Step S27, the algebraic values are interchanged via following steps (a) through (d). Specifically, (a) the present Bs value is substituted in As, (b) the present Bt value is substituted in At, (c) the present Cs value is updated to Bs, and (d) the present Ct value is updated to Bt, and processing moves to Step S28. In Step S28, the difference between Bs and As is divided by the difference between Bt and At, and the average data amount R is calculated afresh, and processing returns to Step S23. This average data amount R becomes the gradient shown in a broken line from point B to point Q1 in FIG. 3B. This broken line is the first estimated straight line where the playback time is proportional to the data amount. To speak more generally, the average data amount R calculated afresh is the ratio of the difference between actual playback times of information unit to the difference between data amounts at the most recently obtained two estimated recorded positions.

When processing returns to Step S23, processing from Step S23 to Step S28 is repeated in the same manner, and when the difference between the desired time Jt and Ct is determined within the permissible range in Step S26, processing is ended as the desired time Jt is reached.

The estimated sector Cs calculated by the second average data amount R calculated afresh corresponds to sector Cs (2) at point P2 where time on ordinate of the straight line (second estimated straight line) connecting point B and point Q1 becomes the desired time Jt. Using this sector Cs (2) and graph f, the time Ct (2) of the actual coded data is obtained. The time Ct (2) can be obtained as the time at point Q2 where sector Cs (2) and graph f intersect each other. However, this time Ct (2) also deviates from the permissible range.

Consequently, the third average data amount R is calculated. The third average data amount R calculated for the third time is expressed by the gradient of the straight line from point Q1 to point Q2. This straight line is the third estimated straight line. The estimated sector Cs calculated by the relevant average data amount R is the sector Cs (3) at point P3 where time on ordinate of the straight line connecting point Q1 to point Q2 becomes the desired time Jt. Using this sector Cs (3) and graph f, the time Ct (3) of the actual coded data is obtained. The time Ct (3) can be obtained as the time at point Q3 where sector Cs (3) and graph f intersect each other. Because this time Ct (3) is included in the permissible range shown by the solid line, system controller 4 (FIG. 1) judges that the desired time Jt is reached and processing for searching the desired playback time is ended.

As described above, it is possible to search the sector Js that corresponds to the desired time Jt in fewer access frequencies according to the present embodiment, even in the playback of disc 1 by the recording scheme in which playback time of the information unit is not proportional to the coded data amount of the relevant information unit.

Note that it is possible to configure processing with Step S28 omitted in the flow chart shown in FIG. 2. Processing is returned to Step S23 without carrying out Step S28 where the average data amount R is calculated afresh and the estimated sector Cs is re-calculated on the basis of the average data amount R first calculated in Step S22, where the present Cs value is only required to be substituted to Bs and the present Ct value into Bt for interchanging the algebraic values of Step S27. In the processing with Step S28 omitted, the flow is simplified, however on the contrary, the number of accesses to reach the desired time increases. Whether Step S28 for calculating the average data amount R afresh is provided or not should be decided based on the practical applications where the most suitable one can be selected.

In addition to the above-mentioned modifications, another different modification example can be selected. That is, the modification example is to integrate the average data amount R calculation equation described in different calculation equations in Steps S22 and S28 (FIG. 2) into one. According to this modification example, because if the present invention is materialized as a computer program, further shorter coding becomes possible and at the same time, the value calculated in Step S22 is not used for the average data amount R as it is but the value updated each time is used, still more accurate processing can be achieved. The modification example is described as follows.

Figure 4:
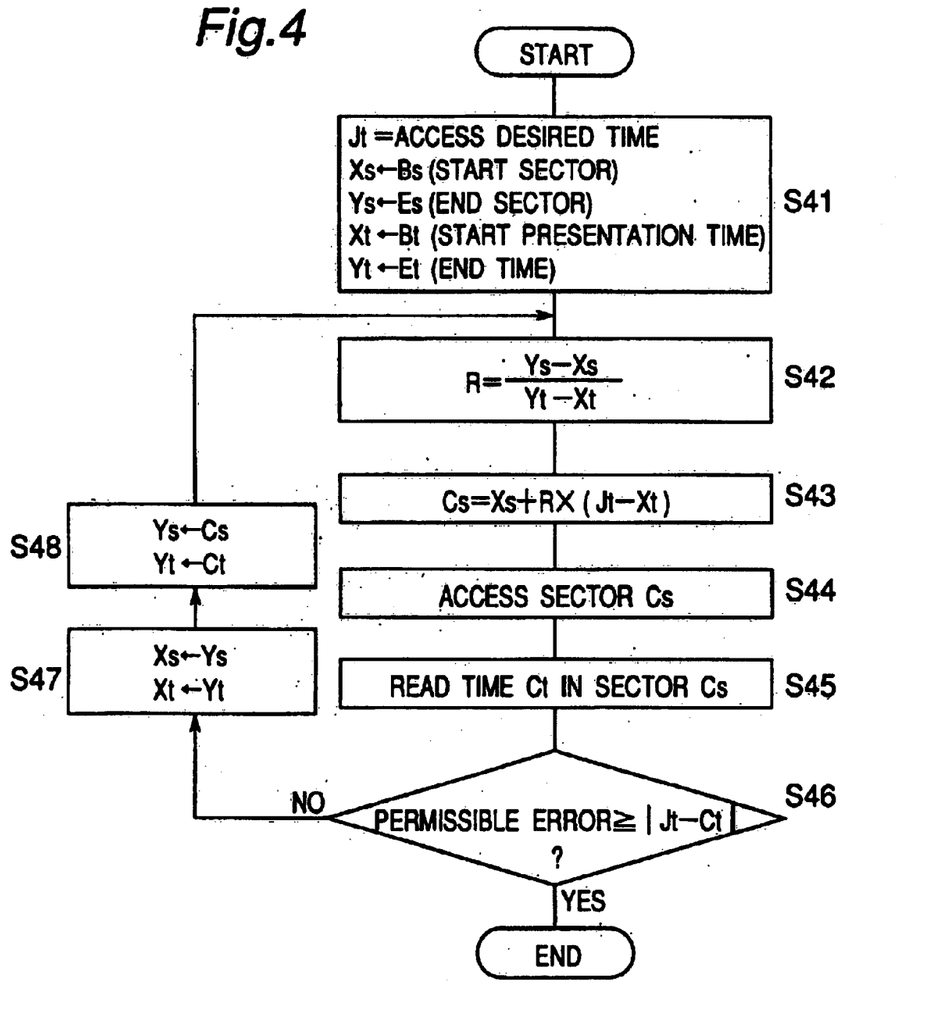
FIG. 4 is a flow chart of search treatment of the desired playback time by a modified example of the present invention.

FIG. 4 is a flow chart of the search processing of the desired playback time by the modified example of the present embodiment. As shown in the flow chart of FIG. 4, four parameters Xs, Ys, Xt, Yt are provided and by successively updating these parameters, the repetitive calculation of the average data R can be achieved by one equation. Xs denotes the start sector at the time of the calculation, Ys the end sector, Bt the start presentation time, and Yt the end time. The desired time Jt of access entered by the user and initial values of Xs, Ys, Bt, Yt are held in the playback apparatus 10 (FIG. 1) as the predetermined information.

First of all, in Step S41, initial values of Xs, Ys, Bt, Yt are entered in the four parameters Xs, Ys, Xt, Yt, respectively, and processing moves to Step S42. In Step S42, the difference between Es and Bs which are coded data amounts, is divided by the difference between Et and Bt, the average data amount R is calculated, and processing moves to Step S43. In Step S43, the difference between desired times Jt and Xt is multiplied by R, Xs is added to the product, and the estimated sector Cs with the desired hour coded data recorded is obtained. Processing from Steps S44 to S46 thereafter is the same as that from Steps S24 to S26 and the description is omitted.

When the permissible error of the sector Cs is not included in the specified range (in the case of "No" of Step S46), Steps S47, S48 are carried out and parameters are updated. More specifically, in Step S47, the end sector Ys till then is substituted as start sector Xs and the end time Yt is substituted in the start time Yt. Furthermore, in Step S48, with the sector Cs obtained before is used as the end sector Ys and the time Ct is substituted in the end time Yt. In this way, four parameters are updated one after another and the average data amount R is calculated every time the calculation is carried out. According to the above processings, still more accurate processing can be carried out.

As described above, the embodiments according to the present invention are discussed. The "track" in the present embodiment is just one example of information unit and it should not be limited to this if the information containing audio information such as natural environmental sound and audio information for enjoying dramas, entertainments, for broadcasting and news, for education such as language, for being used in scientific technical fields is composed with playback time as a unit, which defines a start time and an end time of the relavant information.

In addition, in Step S26 of FIG. 2 and in Step S46 of FIG. 5, when the desired time Jt and the time Ct of access position entered by the user is permissible error$\geq$|Jt−Ct|; search processing of the playback time is ended because the desired time Jt is reached. Consequently, this inequality may hold for even when Jt<Ct. However, that Jt<Ct holds means that playback is started from the time later than the desired time entered by the user, and may cause the user to feel inconvenience. Consequently, when playback from time Ct later than the desired time Jt is prohibited, the inequality described above should be $0 \leq Jt - Ct \leq$ permissible error. In addition, description was made with the permissible error designated ±1 second, but the permissible error shall not be restricted to this fixed value. It may be dynamically decided according to the compression ratio of the coded data in the vicinity of the desired time, etc.

The processing operation of the playback apparatus 10 (FIG. 1) described using the flow charts of FIG. 2 and FIG. 4 above and other operations of playback apparatus 10 (FIG. 1) according to the present invention can be achieved as a computer program described to act in such a manner. Such computer program can be recorded on a suitable storage media including nonvolatile storage such as flash ROM, etc., volatile storage such as DRAM, etc., optical discs, magnetic storage media such as floppy discs, etc. In such occasion, in the concept of the "storage media," computers and other storage units that provide contents via telecommunication lines such as Internet, satellite communication, etc. are included. Consequently, servers, etc. for storing the computer program for achieving the operations of the present invention and transmitting the program to other terminals are included in the category of the storage media with the computer program recorded.

INDUSTRIAL APPLICABILITY

As described above, according to the present invention, even the playback apparatus for playing back the recording medium by a recording method in which the information unit playback time is not proportional to the data amount can search the coded data that corresponds to the desired time signals in fewer access frequencies.

What is claimed is:

1. A playback apparatus comprising;
   a playback section for reading an information unit and management information from a recording medium on which the information unit of audiovisual subject for a user and the management information containing playback time information pertaining to a playback time of the information unit and recorded position information pertaining to a recorded position of the information unit are recorded;
   an operating section for inputting a desired playback time of the information unit; and
   a control section for searching the recorded position on the recording medium of the information unit based on the recorded position information read by the playback section and for controlling the playback section to play back the information unit from the recorded position,
   wherein when the information unit is played back from the desired playback time inputted from the operating section, the control section finds an estimated straight line in which the playback time and data amount are proportional to each other based on the playback time information and the recorded position information, the control section searches an estimated recorded position that corresponds to the desired playback time based on the estimated straight line, calculates an error between an actual playback time of the information unit at the estimated recorded position and the desired playback time, and identifies the estimated recorded position as the recorded position of the information unit on the recording medium that corresponds to the desired playback time when the error is within a specified range.

2. The playback apparatus according to claim 1, wherein a gradient of the estimated straight line is a ratio of the playback time of the information unit to the data amount.

3. The playback apparatus according to claim 1, wherein if the error is beyond the specified range, the control section finds a next estimated straight line at least based on the estimated recorded position and the playback time of the information unit that corresponds to the estimated recorded position, searches the next estimated recorded position that corresponds to the desired playback time based on the estimated straight line, calculates an error between an actual playback time of the information unit at a next estimated recorded position and the desired playback time, and repeats searching until the error is included in the specified range.

4. The playback apparatus according to claim 3, wherein a gradient of a next estimated straight line is a ratio of a difference of the actual playback time of the information unit to a difference of the data amount at the most recently obtained two estimated recorded positions.

5. A playback method comprising steps of:
   reading an information unit and management information from a recording medium on which the information unit of audiovisual subject for a user and the management information containing playback time information pertaining to a playback time of the information unit and recorded position information pertaining to a recorded position of the information unit are recorded;
   inputting a desired playback time of the information unit;
   searching the recorded position on the recording medium of the information unit based on the recorded position information read; and
   controlling playback to play back the information unit from the recorded position,
   wherein when the information unit is played back from the desired playback time inputted, the playback method further comprises steps of:
   finding an estimated straight line in which the playback time and data amount are proportional to each other based on the playback time information and the recorded position information;
   searching an estimated recorded position that corresponds to the desired playback time based on the estimated straight line;
   calculating an error between an actual playback time of the information unit at the estimated recorded position and the desired playback time; and
   identifying the estimated recorded position as the recorded position of the information unit on the recording medium that corresponds to the desired playback time when the error is within a specified range.

6. The playback method according to claim 5, wherein said finding the estimated straight line includes calculating a ratio of the playback time of the information unit to the data amount to find a gradient of the estimated straight line.

7. The playback method according to claim 5, wherein when the error is beyond the specified range, the playback method includes steps of:
   (a) finding a next straight line at least based on the estimated recorded position and the playback time of the information unit that corresponds to the estimated recorded position;

(b) searching the next estimated recorded position that corresponds to the desired playback time based on the estimated straight line;
(c) calculating an error between an actual playback time of the information unit at a next estimated recorded position and the desired playback time; and
(d) repeating steps (a) through (c) until the error is included in the specified range.

8. The playback method according to claim 7, wherein said finding a next estimated straight line includes a step of calculating a ratio of a difference of the actual playback time of the information unit to a difference of the data amount at the most recently obtained two estimated recorded positions to find a gradient of the next estimated straight line.

* * * * *